US012592497B2

(12) United States Patent
Lee et al.

(10) Patent No.: US 12,592,497 B2
(45) Date of Patent: Mar. 31, 2026

(54) MICROWAVE BEAM-FORMING ANTENNA

(71) Applicant: ELECTRONICS AND TELECOMMUNICATIONS RESEARCH INSTITUTE, Daejeon (KR)

(72) Inventors: Jung Nam Lee, Daejeon (KR); Heon Kook Kwon, Daejeon (KR); Kwang Seon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 248 days.

(21) Appl. No.: 17/899,729

(22) Filed: Aug. 31, 2022

(65) Prior Publication Data

US 2023/0216211 A1 Jul. 6, 2023

(30) Foreign Application Priority Data

Dec. 30, 2021 (KR) ........................ 10-2021-0192253

(51) Int. Cl.
*H01Q 21/06* (2006.01)
*H01Q 13/02* (2006.01)
*H01Q 19/19* (2006.01)
*H01Q 21/00* (2006.01)

(52) U.S. Cl.
CPC ........... *H01Q 21/064* (2013.01); *H01Q 13/02* (2013.01); *H01Q 19/19* (2013.01); *H01Q 21/0006* (2013.01)

(58) Field of Classification Search
CPC .... H01Q 13/02; H01Q 19/19; H01Q 21/0006; H01Q 21/064
See application file for complete search history.

(56) References Cited

U.S. PATENT DOCUMENTS 8,284,102 B2 10/2012 Hayes et al.
10,374,321 B2 8/2019 Evtyushkin et al.
10,587,055 B1 * 3/2020 Rao .......................... H01Q 5/45
10,680,341 B1 * 6/2020 Anderson .............. H01Q 15/16
11,088,460 B2 8/2021 Sanjuan Flores et al.
2010/0052987 A1 * 3/2010 Weinstein .............. H01Q 21/24 342/372
2010/0117893 A1 5/2010 Dreher et al.
2018/0131101 A1 5/2018 Evtyushkin et al.
2018/0331431 A1 * 11/2018 Lee ...................... H01Q 19/191
2021/0305692 A1 9/2021 Walker et al.

FOREIGN PATENT DOCUMENTS

KR 10-2005-0036595 A 4/2005
KR 10-2011-0075218 A 7/2011
KR 10-2015-0000523 A 1/2015
KR 10-2020-0132170 A 11/2020

* cited by examiner

*Primary Examiner* — Amal Patel
(74) *Attorney, Agent, or Firm* — LRK PATENT LAW FIRM

(57) ABSTRACT

A microwave beam-forming antenna may include: a main reflector installed on one surface of an antenna body; an array feed horn installed on a center portion of the main reflector; a sub-reflector disposed to be spaced apart from the array feed horn on the main reflector; and a plurality of waveguide feeds respectively connected to a plurality of horn antennas arranged in the array feed horn.

8 Claims, 10 Drawing Sheets

MICROWAVE BEAM-FORMING ANTENNA

CROSS-REFERENCE TO RELATED APPLICATION

This application claims priority to Korean Patent Application No. 10-2021-0192253, filed on Dec. 30, 2021, with the Korean Intellectual Property Office (KIPO), the entire contents of which are hereby incorporated by reference.

BACKGROUND

1. Technical Field

Exemplary embodiments of the present disclosure relate to a microwave antenna, and more specifically, to a microwave beam-forming antenna capable of forming numerous beams and performing beam forming by using numerous horn antennas as feed antennas for a reflector antenna.

2. Description of Related Art

A terahertz wave is a frequency resource in a band of 0.1 to 10 THz, and is an unexplored frequency electromagnetic wave resource corresponding to a middle region of a far infrared ray and a millimeter wave in the electromagnetic wave spectrum, and having unique physical characteristics simultaneously showing the permeability of a radio wave and the straightness of a light wave.

Since a terahertz frequency band is a vibrational frequency region of molecular motion, it can be applied to a spectroscopy system which is suitable for material component analysis and thus is provided for research on material properties, molecules, life, and the like, an imaging system for shaping measured spectral properties as two-dimensional or three-dimensional images, and a high-speed wireless communication system using a wide frequency bandwidth.

Currently, research on a terahertz wave band is limited to an oscillation element and a detection element which generate and detect a signal in a short-range frequency band, and there is a disadvantage of low power/low sensitivity.

In the future, it is expected that a wireless communication technology of 6G or higher will use a terahertz wave. A current low-gain antenna for local detection is not suitable for long-distance wireless communication. A horn antenna and a Cassegrain antenna represent antennas for high-gain long-distance transmission.

The Cassegrain antenna is also used for satellite communication due to an ultra-high gain characteristic thereof, but there is a problem in that a size thereof is large, manufacturing is complicated, and manufacturing costs are expensive, and since electronic beam-forming is impossible, there is a limitation.

The horn antenna has an advantage of being manufactured in a small size and relatively easily manufactured, but since the antenna gain is approximately a medium gain, there is a limitation in long-distance transmission. A high gain antenna has an advantage in long-distance transmission, but has a disadvantage in that a beam width is narrow.

When the beam width is narrow, since it is difficult to provide a service to numerous users, a beam forming technology is essentially required. However, it is very difficult to realize beam forming of the reflector antenna (Cassegrain antenna) and the horn antenna at a very high frequency. Also, since a wavelength is very short, synthesis between the antennas is impossible.

In order to solve this problem, in the case of the Cassegrain antenna, beam forming is realizing by mechanically rotating an angle of a sub-reflector or a feed horn. Since this requires a motor for additional physical implementation and a beam switching speed is very slow, there is a limitation.

SUMMARY

Accordingly, exemplary embodiments of the present disclosure are provided to substantially obviate one or more problems due to limitations and disadvantages of the related art.

Exemplary embodiments of the present disclosure provide a microwave beam-forming antenna, which has a reflector antenna structure for high gain and a structure in which a main reflector of a Cassegrain antenna is implemented in a small size for a wide beam width, and which can perform high gain beam forming in a microwave band as numerous feed horn antennas are arranged for beam forming, and a waveguide configured to transmit a signal to the numerous feed horn antennas is configured on a side surface of the Cassegrain antenna.

Exemplary embodiments of the present disclosure also provide a microwave beam-forming antenna using an electric beam forming method of reducing an overall antenna size and connecting numerous waveguide lines and a beam-forming chip, a fixed beam forming method of applying a signal to each waveguide, and a beam forming method of a combination of the two methods.

According to an exemplary embodiment of the present disclosure, a microwave beam-forming antenna may comprise: a main reflector installed on one surface of an antenna body; an array feed horn installed on a center portion of the main reflector; a sub-reflector disposed to be spaced apart from the array feed horn on the main reflector; and a plurality of waveguide feeds respectively connected to a plurality of horn antennas arranged in the array feed horn.

Each of numerous waveguide feeds among the plurality of waveguide feeds may include a bent portion bent at a right angle in the antenna body; and end portions thereof extend to side surfaces of the antenna body.

The microwave beam-forming antenna may further comprise a plurality of waveguide connectors respectively connected to the end portions at the side surfaces of the antenna body.

An end portion of any one of the plurality of waveguide feeds may extend to a lower surface or a bottom surface of the antenna body to be exposed at the lower surface or the bottom surface of the antenna body.

A shape of the array feed horn may be a circular shape or a polygonal shape.

A shape of each of the plurality of horn antennas installed in the array feed horn may be a circular shape or a polygonal shape.

Each of the plurality of horn antennas may include a rectangular opening which is open in a beam radiation direction at a center thereof; and at least two of the plurality of horn antennas may be arranged so that longitudinal directions of the rectangular openings are different from each other.

The number of the plurality of waveguide feeds may be the same as the number of horn antennas of the array feed horn.

A beam angle due to beam forming may be formed according to arranged positions of the plurality of horn antennas disposed in the array feed horn.

A beam-forming chip may be connected to each of the plurality of waveguide feeds to cover a fixed beam forming shaded region due to active beam forming.

The microwave beam-forming antenna may further comprise a grounding body formed on the antenna body.

According to the present disclosure, a high gain beam forming antenna using a microwave band can be implemented by implementing a main reflector of a Cassegrain antenna in a small size for a wide beam width, arranging numerous feed horn antennas for beam forming, configuring a waveguide which transmits a signal to the numerous feed horn antennas on a side surface of the Cassegrain antenna to reduce the overall antenna size, and using an electric beam forming method connecting numerous waveguide lines and a beam-forming chip, a fixed beam forming method of applying a signal to each waveguide, and a beam forming method that combines the two methods, and accordingly, it is possible to contribute to efficient use of a frequency by increasing power consumption efficiency of the antenna, improving signal quality, and resolving a shaded region.

DETAILED DESCRIPTION OF THE EMBODIMENTS

Figure 1:
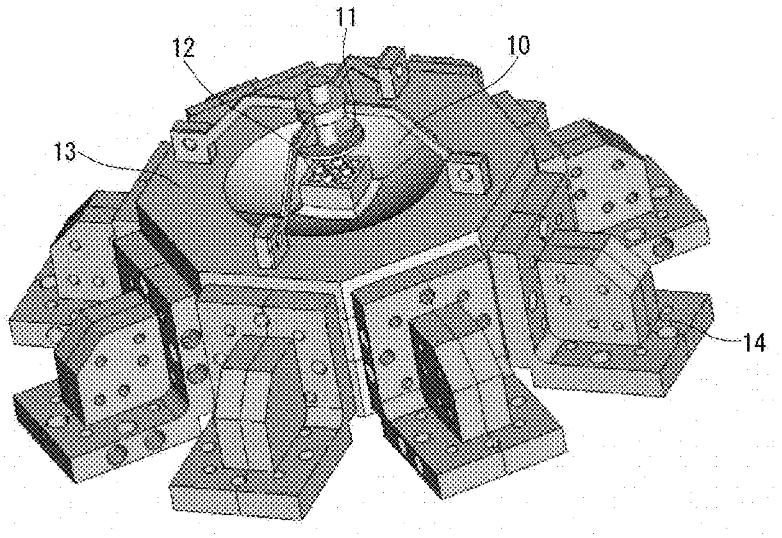
FIG. 1 is a perspective view of a microwave beam-forming antenna according to one embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which embodiments according to the present disclosure are applied will be described. The communication system may be a 4G communication system (for example, a long-term evolution (LTE) communication system or an LTE-A communication system), a 5G communication system (for example, a new radio (NR) communication system), and the like. The 4G communication system may support communication in a frequency band of 6 GHz or less, and the 5G communication system may support communication in a frequency band of 6 GHz or more in addition to the frequency band of 6 GHz or less. The communication system to which the embodiments according to the present disclosure are applied is not limited to contents to be described below, and the embodiments according to the present disclosure may be applied to various communication systems. Here, the communication system may be used to mean the same as a communication network, and “the LTE” may indicate “4G communication system”, “LTE communication system” or “LTE-A communication system”, and “the NR” may indicate “5G communication system” or “NR communication system”.

FIG. 1 is a perspective view of a microwave beam-forming antenna according to one embodiment of the present disclosure.

Referring to FIG. 1, the microwave beam-forming antenna is a Cassegrain antenna, and includes a main reflector 10, a sub-reflector 11, an array horn feed 12, a grounding body 13, and a waveguide connector 14. The microwave beam-forming antenna (briefly, referred to as the ‘Cassegrain antenna’) is composed of two focal points, the main reflector, and the sub-reflector.

The main reflector 10 forms a parabolic surface due to a virtual focal point. The sub-reflector 11 is configured as a hyperbolic surface formed from a relationship between a focal point coincident with a phase center point of an actual array horn feed 12 and the virtual focal point.

A conventional Cassegrain antenna has a high gain characteristic, but has a very narrow beam width. For this reason, the conventional Cassegrain antenna is not generally used in the mobile communication field that needs to secure wide coverage, and is mainly used in satellite communication. However, it is impossible to use a horn or patch antenna in terahertz mobile communication that uses a high frequency and requires high-speed communication. Accordingly, in the embodiment, a diameter of the main reflector 10 is reduced to expand a beam width.

In the embodiment, the diameter of the main reflector 10 may be 30 mm to 18 cm, which is a very small diameter compared to a diameter of the conventional Cassegrain antenna (for example, tens of centimeters or more). When the diameter of the Cassegrain antenna is 30 mm, it may be effectively applicable to a terahertz transceiver having a channel capacity of 1 Tbps at 100 Gbps and capable of performing transmission and reception at a distance of several km.

Further, a feed unit of the conventional Cassegrain antenna uses a single horn antenna having a circular shape or a quadrangular shape. Since beam forming of a traditional Cassegrain antenna is impossible, the beam forming is performed by mechanically moving a sub-reflector using a motor. Because the sub-reflector is controlled by the motor, a size of the antenna increases, a structure becomes complicated, and high-speed beam forming is impossible. Accordingly, in the embodiment, in the horn feed unit, a structure of the array horn 12 is used, and the waveguide feeds are formed as much as the number of feed horns 12 on side surfaces of the grounding body 13 to induce the beam forming by applying a signal to the waveguide feeds without increasing the overall size of the antenna.

In the embodiment, the horn feed unit is a structure in which a plurality of horn antennas are arranged, and may be referred to as an array horn, an array horn structure, an array feed horn, an array horn feed, an array feed horn structure, an array horn feed structure, and the like.

According to the embodiment, a signal applied through each waveguide connector 14 may pass through the array horn feed 12 to be primarily reflected from the sub-reflector 11, and the primarily-reflected signal may be secondarily reflected through the main reflector 10 to be spread through the air. A case of signal reception is opposite the above case.

Figure 2:
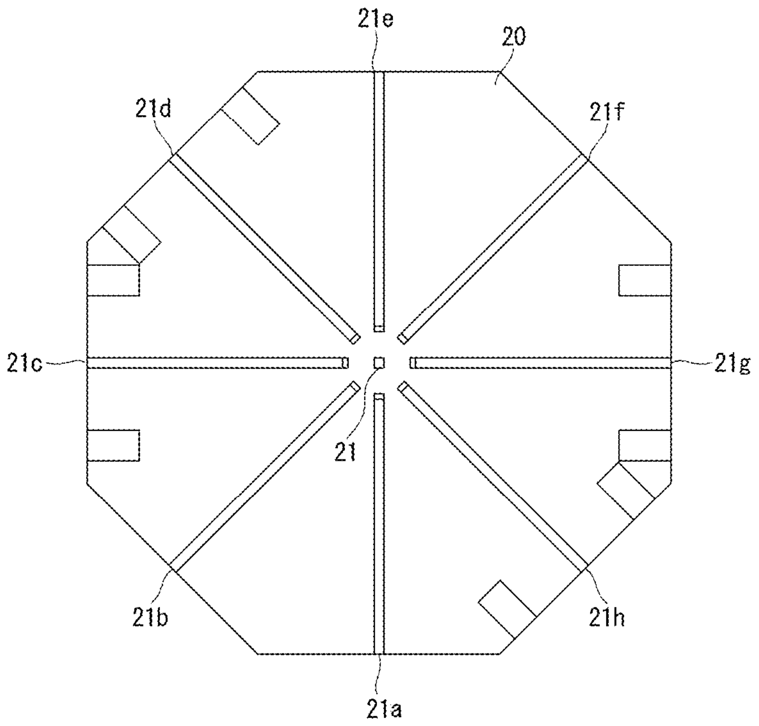
FIG. 2 is a plan view for describing a waveguide array structure of the microwave beam-forming antenna in FIG. 1.
Figure 3:
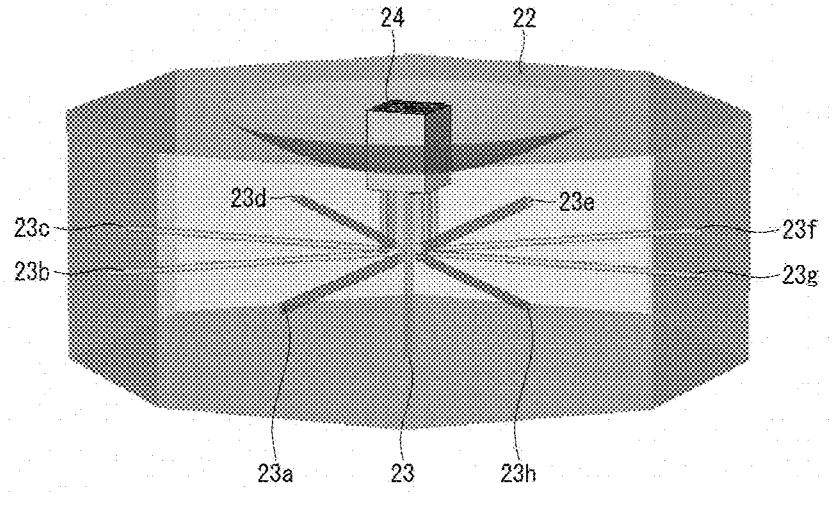
FIG. 3 is a partially projected perspective view viewed from a front side for describing the waveguide array structure of the microwave beam-forming antenna in FIG. 1.

FIG. 2 is a plan view for describing a waveguide array structure of the microwave beam-forming antenna in FIG. 1. FIG. 3 is a partially projected perspective view viewed from a front side for describing the waveguide array structure of the microwave beam-forming antenna in FIG. 1.

The waveguide array structure of the microwave beam-forming antenna shown in FIG. 2 is a structure viewed from an upper side by cutting a middle surface of the microwave beam-forming Cassegrain antenna in FIG. 1.

In the waveguide array structure of the microwave beam-forming antenna, a plurality of waveguide feeds 21*a* to 21*h* in a number as many as the number of feed horns are formed in a radial direction around a feed pin 21 located at a center of an antenna body on a grounding body 20.

Further, as shown in FIG. 3, the waveguide array structure vertically descends from a feed horn 24 (corresponding to 12 in FIG. 1) and then is bent at a middle portion in the antenna body toward the outer side of a grounding body 22 (corresponding to 13 in FIG. 2) at an approximate right angle to be formed on side surfaces of the antenna body. That is, in a waveguide array, one end portions 23*a* to 23*h* of most of the waveguide feeds may be exposed at the side surfaces of the antenna body to extend to or be connected to waveguide feeds in an antenna connector. In the waveguide array, one end portion 23 of one waveguide feed may be exposed at a back surface/bottom surface of the antenna body. According to this waveguide array structure, it is possible to prevent a disadvantage in that a size of an entire antenna increases when the waveguide structure is located on the back surface/bottom surface of the antenna body like the conventional Cassegrain antenna.

FIGS. 4A to 4E are exemplary diagrams illustrating an array horn feed structure which may be employed in the microwave beam-forming antenna in FIG. 1.

Referring to FIGS. 4A to 4E, in the array horn feed structure, rectangular openings of numerous horn antennas may be disposed in an array of being rotated in various directions.

Figure 4A:
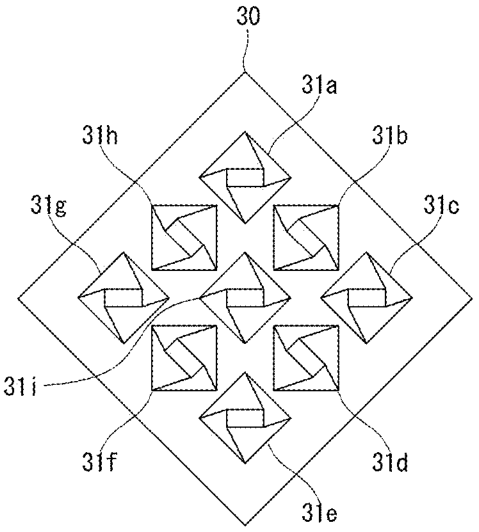
FIGS. 4A to 4E are exemplary diagrams illustrating an array horn feed structure which may be employed in the microwave beam-forming antenna in FIG. 1.

Referring to FIG. 4A, when nine horn antennas 31*a* to 31*i* are arranged, five horn antennas 31*i*, 31*a*, 31*c*, 31*e*, and 31*g* may be respectively disposed in the center and east, west, south, and north directions of an array horn feed structure 30 (corresponding to 12 in FIG. 1) so that longitudinal directions of rectangular openings at centers of the horn antennas are oriented horizontally from the ground, and four horn antennas 31*b*, 31*d*, 31*f*, and 31*h* may be respectively disposed in northwest, southwest, southeast, and northeast directions of the array horn feed structure 30 so that longitudinal directions of rectangular openings thereof may face the northeast direction and the southwest direction.

In this case, a cross-sectional shape of the array horn feed structure 30 may have a quadrangular shape or square shape and have four corners disposed in east, west, south, north, and south directions, but the present disclosure is not limited thereto, and the array horn feed structure may have various cross-sectional shapes such as a polygonal shape, a circular shape, and the like. Further, a cross-sectional shape of the horn antenna has a quadrangular shape or square shape, but the present disclosure is not limited thereto, and the array horn feed structure may have various cross-sectional shapes such as a polygonal shape, a circular shape, and the like.

Figure 4B:
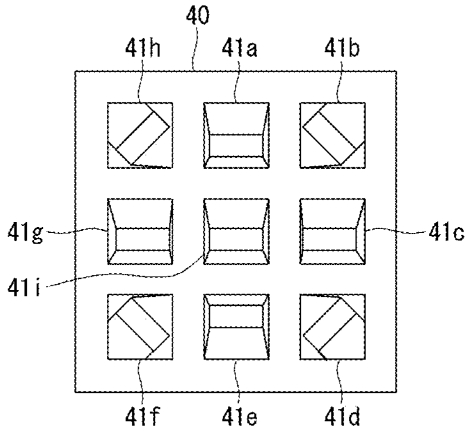

Referring to FIG. 4B, when nine horn antennas 41*a* to 41*i* are arranged in an array horn feed structure 40 (corresponding to 12 in FIG. 1) of which a cross-section has a quadrangular shape or square shape and four sides are respectively disposed in east, west, south, and north directions, five horn antennas 41*i*, 41*a*, 41*c*, 41*e*, and 41*g* may be respectively disposed in the center and east, west, south, and north directions of the array horn feed structure 40 so that longitudinal directions of rectangular openings at centers of the horn antennas are oriented horizontally from the ground, and four horn antennas 41*b*, 41*d*, 41*f*, and 41*h* may be respectively disposed in northwest, southwest, southeast, and northeast directions of the array horn feed structure 40 so that longitudinal directions of rectangular openings thereof may respectively face the northeast direction, the northwest direction, the northeast direction, and the northwest direction.

Figure 4C:
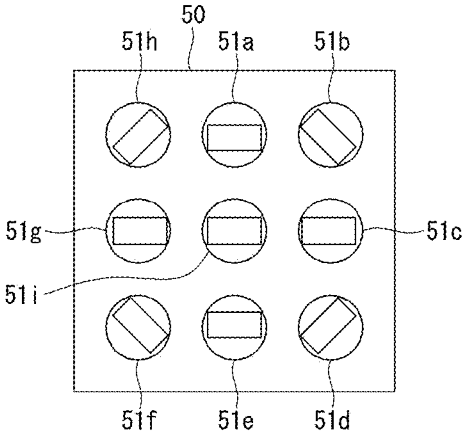

Referring to FIG. 4C, when nine horn antennas 51*a* to 51*i* are arranged in an array horn feed structure 50 (corresponding to 12 in FIG. 1) of which a cross-section has a quadrangular shape or square shape and four sides are respectively disposed in east, west, south, and north directions, five horn antennas 51*i*, 51*a*, 51*c*, 51*e*, and 51*g* may be respectively disposed in the center and east, west, south, and north directions of the array horn feed structure 50 so that longitudinal directions of rectangular openings at centers of the horn antennas are oriented horizontally from the ground, and four horn antennas 51*b*, 51*d*, 51*f*, and 51*h* may be respectively disposed in northwest, southwest, southeast, and northeast directions of the array horn feed structure 50 so that longitudinal directions of rectangular openings thereof may respectively face the northeast direction, the northwest direction, the northeast direction, and the northwest direction.

In the embodiment, the cross-sectional shape of the horn antenna has a circular shape, but the present disclosure is not limited thereto, and the cross-sectional shape may be various shapes such as a square shape, a rectangular shape, a quadrangular shape, an octagonal shape, a polygonal shape, a circular shape, and the like.

Figure 4D:
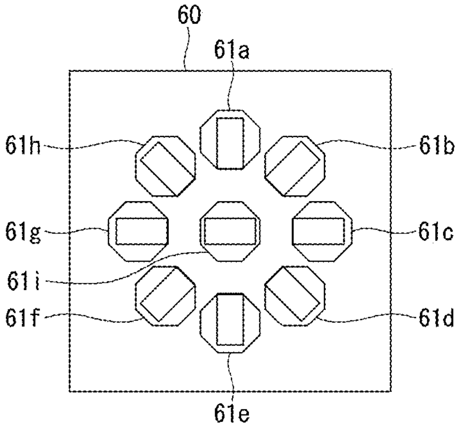

Referring to FIG. 4D, when nine horn antennas 61*a* to 61*i* are arranged in an array horn feed structure 60 (corresponding to 12 in FIG. 1) of which a cross-section has a quadrangular shape or square shape and four sides are respectively disposed in east, west, south, and north directions, three horn antennas 61*i*, 61*c*, and 61*g* may be respectively disposed in the center and east and west directions of the array horn feed structure 60 so that longitudinal directions of rectangular openings at centers of the horn antennas are oriented horizontally from the ground, two horn antennas 61*a* and 61*e* may be respectively disposed in south and north directions of the array horn feed structure 60 so that longitudinal directions of rectangular openings at centers of the horn antennas are oriented vertically from the ground, and four horn antennas 61*b*, 61*d*, 61*f*, and 61*h* may be respectively disposed in northwest, southwest, southeast, and northeast directions of the array horn feed structure 60 so that longitudinal directions of rectangular openings thereof may face the center.

In the embodiment, the cross-sectional shape of the horn antenna has an octagonal shape, but the present disclosure is not limited thereto, and the cross-sectional shape may be various shapes such as a polygonal shape, a circular shape, and the like in addition to a square shape, a rectangular shape, a quadrangular shape, and an octagonal shape.

Figure 4E:
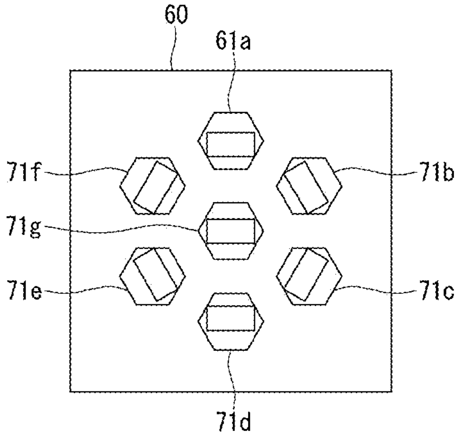

Referring to FIG. 4E, when seven horn antennas 71*a* to 71*g* are arranged in an array horn feed structure 70 (corresponding to 12 in FIG. 1) of which a cross-section has a quadrangular shape or square shape and four sides are respectively disposed in east, west, south, and north directions, one antenna 71*g* may be disposed in the center of the array horn feed structure 70 so that a longitudinal direction of a rectangular opening at a center of the horn antenna is oriented horizontally from the ground, and six horn antennas 71*a* to 71*f* may be respectively disposed around the horn antenna 71*g* at the center so that longitudinal directions of rectangular openings at centers of the horn antennas thereof may surround the horn antenna 71*g* at the center from the ground In the embodiment, the cross-sectional shape of the horn antenna has a hexagonal shape, but the present disclosure is not limited thereto, and the cross-sectional shape may be various shapes such as a polygonal shape, a circular shape, and the like in addition to a square shape, a rectangular shape, a quadrangular shape, and a hexagonal shape.

The horn antenna of each of the above-described array horn feed structures forms a beam. A size of the array horn feed may be smaller than or equal to a size of the sub-reflector. The number of array horn antennas may increase or decrease as much as the number of beams other than the above-described 9 or 7 beams.

Figure 5:
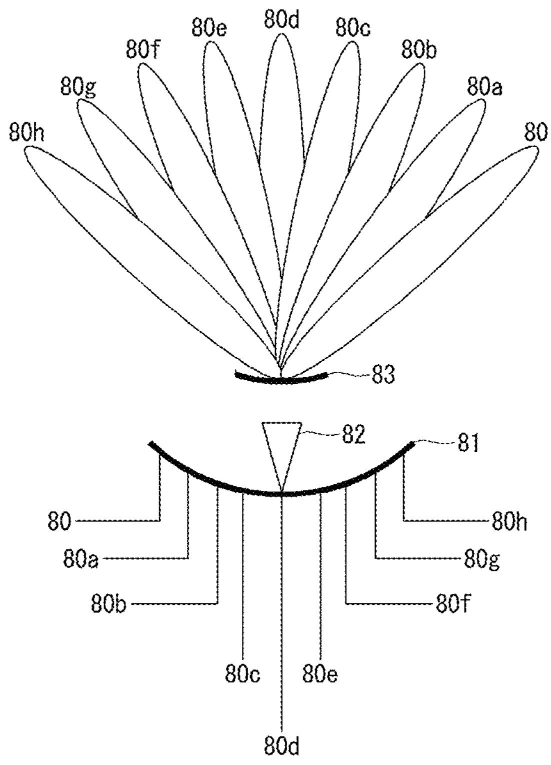
FIG. 5 is an exemplary diagram for describing a passive beam forming operation structure which may be employed in the microwave beam-forming antenna in FIG. 1.

FIG. 5 is an exemplary diagram for describing a passive beam forming operation structure which may be employed in the microwave beam-forming antenna in FIG. 1.

Referring to FIG. 5, the Cassegrain antenna includes waveguide feeds 80 to 80*h*, a main reflector 81, an array horn feed 82, and a sub-reflector 83. The main reflector 81, the array horn feed 82, and the sub-reflector 83 may respectively correspond to the components 10, 12, and 11 in FIG. 1 in the disclosed order.

According to the embodiment, the waveguide feeds 80 to 80*h* are formed according to the desired number of beams, and a signal applied through the waveguide feeds 80, and 80*a* to 80*h* is primarily reflected by the sub-reflector 83 through the array feed horn 82, and the reflected signal is secondarily reflected through the main reflector 81 and is used to form as many beam patterns 84, and 84*a* to 84*h* as the number of waveguide feeds 80, and 80*a* to 80*h* and the array feed horn 82. In the passive beam forming operation structure of the embodiment, an angle of the beam may not be actively changed, and fixed beam forming is possible according to an interval between the horn antennas in the array horn feed 82.

Figure 6:
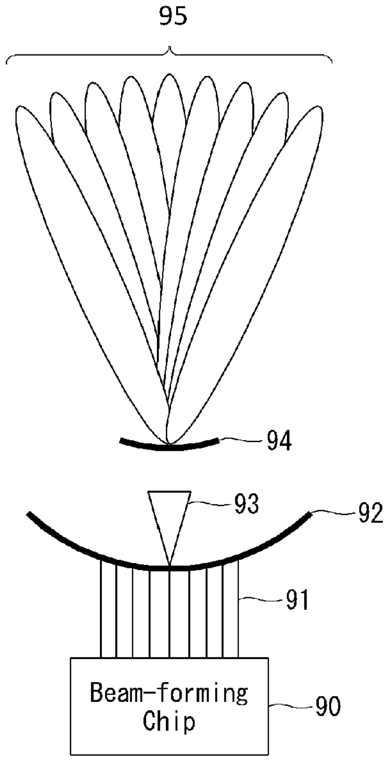
FIG. 6 is an exemplary diagram for describing an active beam forming operation structure which may be employed in the microwave beam-forming antenna in FIG. 1.

FIG. 6 is an exemplary diagram for describing an active beam forming operation structure which may be employed in the microwave beam-forming antenna in FIG. 1.

Referring to FIG. 6, the Cassegrain antenna may include a beam-forming chip 90, a waveguide feed 91, a main reflector 92, an array horn feed 93, and a sub-reflector 94. The array horn feed 93 may be referred to as an array feed horn. The main reflector 92, the array horn feed 93, and the sub-reflector 94 may respectively correspond to the components 10, 12, and 11 in FIG. 1 in the disclosed order of being.

According to the embodiment, a beam forming Cassegrain antenna connects the waveguide feed 91 to the beam-forming chip 90 capable of actively adjusting a phase and an amplitude to perform active beam forming. The beam-forming chip 90 may include a unit which performs a function corresponding to a low-noise amplifier (LNA), a mixer, an amplifier, a coupler, a frequency multiplier, a phase-locked loop (PLL), a voltage-controlled oscillator (VCO), a power amplifier (PA), or a combination thereof, or a configuration corresponding to the unit.

The Cassegrain antenna of the embodiment may have a shaded region between each two beams as only fixed beam forming is possible depending on the number and positions of the array feed horns, but may resolve the shaded region by combining an active beam forming operation mode when operating in a passive beam forming operation mode like the Cassegrain antenna in FIG. 5. That is, the Cassegrain antenna of the embodiment may have a form in which passive and active beam forming structures are combined.

According to the embodiment, since power consumption efficiency is improved by applying a signal to each waveguide feed at a position where a service is required to perform beam forming 95 in a region where the active beam forming is not required, and high-speed beam forming 95 is performed using the beam-forming chip 90 in a region where the active beam forming is required, signal quality may be improved and the shaded region may be resolved.

Figure 7:
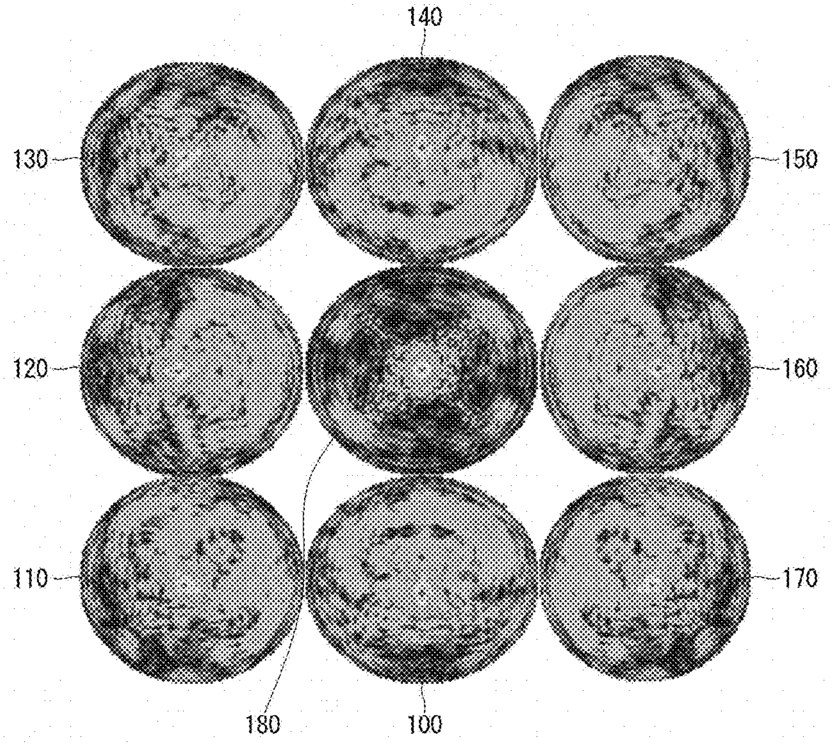
FIGS. 7 and 8 are views for describing a beam pattern characteristic of the microwave beam-forming antenna in FIG. 6.
Figure 8:
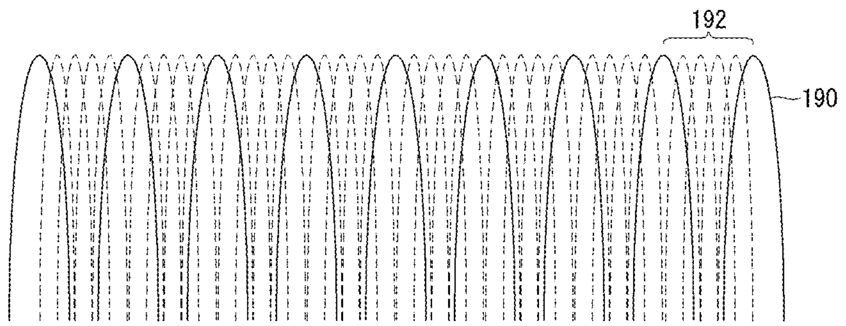

FIGS. 7 and 8 are views for describing a beam pattern characteristic of the microwave beam-forming antenna in FIG. 6.

First, in the region where active beam forming is not required, the microwave beam-forming antenna may operate in the passive beam forming operation mode. In this case, the microwave beam-forming antenna may perform the beam forming 95 by applying a signal to each waveguide feed at a position where a communication service is required. In this case, as shown in the beam patterns 100 to 180 of FIG. 7, the passive beam is formed according to the number and positions of the array feed horn antennas, and there is the shaded region between the beams.

Accordingly, the microwave beam-forming antenna according to the embodiment may be configured to apply both the passive beam forming structure and the active beam forming structure. As shown in FIG. 8, the microwave beam-forming antenna may operate so that active beams 192 are present between passive beams 190, and thus may make a service shaded region disappear.

Like the above, according to the embodiment, a microwave beam-forming antenna which configures a feed portion as an array antenna, may perform beam forming through an array antenna capable of improving a gain of the antenna selectively through a lens, and has a unique structure, a position of a component, a medium, and a unique operation mechanism may be provided.

Figure 9:
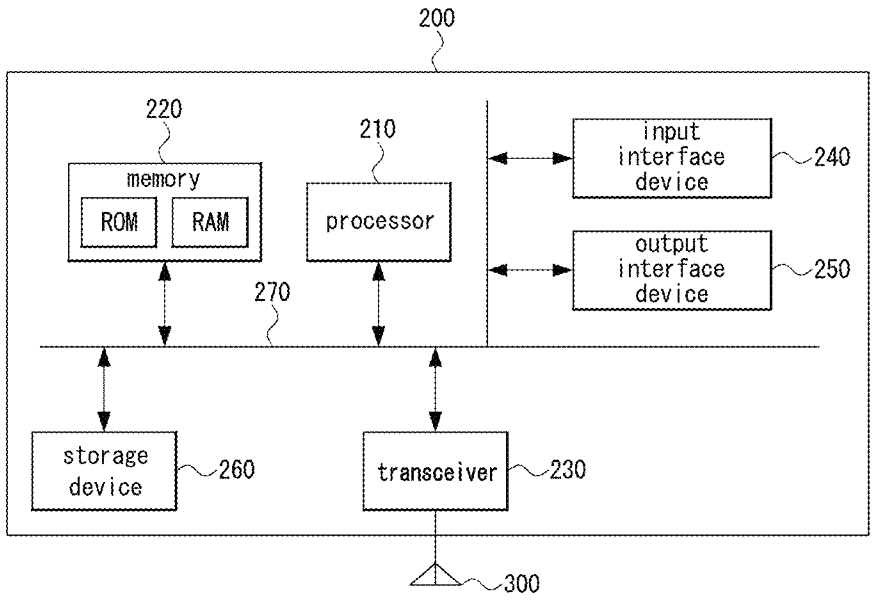
FIG. 9 is a block diagram for describing a main configuration of an antenna controller which may be coupled to the microwave beam-forming antenna in FIG. 1 or a communication node including the same.

FIG. 9 is a block diagram for describing a main configuration of an antenna controller which may be coupled to the microwave beam-forming antenna in FIG. 1 or a communication node including the same.

Referring to FIG. 9, a communication node 200 may include at least one processor 210, a memory 220, and a transceiver 230 connected to a network to perform communication. Further, the communication node 200 may further include an input interface device 240, an output interface device 250, a storage device 260, and the like. Components included in the communication node 200 may be connected to each other by a bus 270 to communicate with each other.

However, each of the components included in the communication node 200 may be connected to the processor 210 through an individual interface or individual bus, not the common bus 270. For example, the processor 210 may be connected to at least one of the memory 220, the transceiver 230, the input interface device 240, the output interface device 250, and the storage device 260 through a dedicated interface.

The processor 210 may execute a program command stored in at least one of the memory 220 and the storage device 260. The processor 210 may refer to a central processing unit (CPU), a graphics processing unit (GPU), or a dedicated processor on which methods according to embodiments of the present disclosure are performed. Each of the memory 220 and the storage device 260 may be configured as at least one of a volatile storage medium and a non-volatile storage medium. For example, the memory 220 may be configured as at least one of a read only memory (ROM) and a random access memory (RAM).

The microwave beam-forming antenna 300 which is described above with reference to FIGS. 1 to 8 may be connected to the transceiver 230.

The communication node 200 in which the microwave beam-forming antenna 300 is installed may be used as a base station or user terminal. The base station and the user terminal may be connected to each other through wireless communication to form a wireless access network.

The user terminal may be referred to as user equipment (UE), a terminal, an access terminal, a mobile terminal, a station, a subscriber station, a mobile station, a portable subscriber station, a node, a device, an Internet of Things (IoT) device, a mounted device (a mounted module/device/terminal, an on board device/terminal, or the like), or the like.

The base station may support 4G communication, 5G communication, wireless communication after 5G, and the like defined in a third-generation partnership project (3GPP) standard. 4G communication including long term evolution (LTE) and LTE-A (advanced) may be performed in a frequency band of 6 GHz or less, and 5G communication referred to as new radio (NR) may be performed in a frequency band of 6 GHz or more in addition to the frequency band of 6 GHz or less. Meanwhile, at least some of one or more communication nodes may perform mutual communication according to an independent method or an independent standard.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A microwave beam-forming antenna comprising:
a main reflector installed on a surface of an antenna body;
an array feed horn installed on a center portion of the main reflector;
a sub-reflector disposed to be spaced apart from the array feed horn on the main reflector;
a plurality of waveguide feeds respectively connected at one end portion of each waveguide feed to a plurality of horn antennas arranged in the array feed horn, wherein another end portion of one waveguide feed of the plurality of waveguide feeds extends to a bottom surface of the antenna body to be exposed at the bottom surface of the antenna body; and
a plurality of waveguide connectors respectively connected to another end portion of the plurality of waveguide feeds, except for the one waveguide feed of the plurality of waveguide feeds, at side surfaces of the antenna body,
wherein each of the plurality of waveguide feeds, except for the one waveguide feed, includes a bent portion at a right angle within the antenna body, and
wherein the one end portion of each waveguide feed, except for the one waveguide feed, extends from a center portion of the antenna body to the side surfaces of the antenna body.

2. The microwave beam-forming antenna of claim 1, wherein a shape of the array feed horn is a circular shape or a polygonal shape.

3. The microwave beam-forming antenna of claim 2, wherein a shape of each of the plurality of horn antennas installed in the array feed horn is a circular shape or a polygonal shape.

4. The microwave beam-forming antenna of claim 3, wherein:
each of the plurality of horn antennas includes a rectangular opening which is open in a beam radiation direction at a center thereof; and
at least two of the plurality of horn antennas are arranged so that longitudinal directions of the rectangular openings are different from each other.

5. The microwave beam-forming antenna of claim 1, wherein the number of the plurality of waveguide feeds is the same as the number of horn antennas of the array feed horn.

6. The microwave beam-forming antenna of claim 1, wherein a beam angle due to beam forming is formed according to arranged positions of the plurality of horn antennas disposed in the array feed horn.

7. The microwave beam-forming antenna of claim 6, wherein a beam-forming chip is connected to each of the plurality of waveguide feeds to cover a fixed beam forming shaded region due to active beam forming.

8. The microwave beam-forming antenna of claim 1, further comprising a grounding body formed on the antenna body.

* * * * *